April 26, 1955 W. W. RAASCH 2,707,097

LEVELLING MECHANISM FOR MALT TURNING MACHINES

Filed May 13, 1953 10 Sheets-Sheet 1

INVENTOR
WILLIAM W. RAASCH

BY

Young & Wright

ATTORNEYS

April 26, 1955 W. W. RAASCH 2,707,097

LEVELLING MECHANISM FOR MALT TURNING MACHINES

Filed May 13, 1953 10 Sheets-Sheet 2

INVENTOR
WILLIAM W. RAASCH

BY Young & Wright

ATTORNEYS

INVENTOR
WILLIAM W. RAASCH

BY
Harris & Wright
ATTORNEYS

April 26, 1955 W. W. RAASCH 2,707,097

LEVELLING MECHANISM FOR MALT TURNING MACHINES

Filed May 13, 1953 10 Sheets-Sheet 4

INVENTOR
WILLIAM W. RAASCH

BY Young & Wright

ATTORNEYS

April 26, 1955 W. W. RAASCH 2,707,097

LEVELLING MECHANISM FOR MALT TURNING MACHINES

Filed May 13, 1953

10 Sheets-Sheet 5

INVENTOR
WILLIAM W. RAASCH

BY Young & Wright

ATTORNEYS

April 26, 1955 W. W. RAASCH 2,707,097

LEVELLING MECHANISM FOR MALT TURNING MACHINES

Filed May 13, 1953 10 Sheets-Sheet 6

INVENTOR
WILLIAM W. RAASCH

BY Young & Wright

ATTORNEYS

April 26, 1955 W. W. RAASCH 2,707,097

LEVELLING MECHANISM FOR MALT TURNING MACHINES

Filed May 13, 1953 10 Sheets-Sheet 7

INVENTOR
WILLIAM W. RAASCH

BY Morsell & Wright

ATTORNEYS

April 26, 1955 W. W. RAASCH 2,707,097

LEVELLING MECHANISM FOR MALT TURNING MACHINES

Filed May 13, 1953 10 Sheets-Sheet 8

INVENTOR
WILLIAM W. RAASCH

BY Mooney & Wright
ATTORNEYS

April 26, 1955 W. W. RAASCH 2,707,097

LEVELLING MECHANISM FOR MALT TURNING MACHINES

Filed May 13, 1953 10 Sheets-Sheet 9

INVENTOR
WILLIAM W. RAASCH

BY Young & Wright

ATTORNEYS

April 26, 1955 W. W. RAASCH 2,707,097

LEVELLING MECHANISM FOR MALT TURNING MACHINES

Filed May 13, 1953 10 Sheets-Sheet 10

INVENTOR
WILLIAM W. RAASCH

BY

Young & Wright

ATTORNEYS

United States Patent Office 2,707,097

Patented Apr. 26, 1955

2,707,097

LEVELLING MECHANISM FOR MALT TURNING MACHINES

William W. Raasch, Milwaukee, Wis., assignor to Galland-Henning Manufacturing Company, Milwaukee, Wis., a corporation Application May 13, 1953, Serial No. 354,734

17 Claims. (Cl. 259—126)

This invention appertains to the handling of barley during the malting process, and more particularly to a motorized malt turning machine employed for turning and agitating the malt on a kiln floor.

During the kilning process, the motorized malt turning machine is intermittently driven back and forth over the kiln floor and during this movement a series of pairs of oppositely rotating helix blades travel through the malt bed for turning and agitating the malt. Initially, the green malt is dumped on the kiln floor in a series of mounds or piles by means of an overhead traveling spout. As the machine travels forward toward the mounds, certain of the helix blades engage the malt and others are rotating free of load, which places uneven strain on the machine and considerable time is taken to level off the mounds or piles and distribute the malt, and an uneven malt bed is invariably made.

It is, therefore, one of the primary objects of this invention to provide novel means for engaging the mounds or piles of malt for quickly and uniformly distributing the malt over the kiln floor to the desired depth in advance of the helix blades, whereby all of the blades will effectively engage and turn the malt.

Another salient object of my invention is to provide a right and left hand screw conveyor extending laterally from the transverse center of the machine toward its opposite ends mounted on a single rotating shaft in front of the helix blades for engaging the malt piles or mounds for carrying the malt in opposite directions evenly over the floor.

A further important object of my invention is to provide means driven from a part of the operating mechanism of the machine for raising and lowering the screw conveyor into and out of the malt bed.

Another further object of the invention is to provide means for automatically stopping the machine as the machine nears the end of the floor, so as to permit the raising of the conveyor out of the way to prevent injury to the conveyor and to then permit further travel of the machine to the extreme end of the floor.

Another further object of my invention is to provide means for automatically disconnecting the raising means for the conveyor when the conveyor reaches a predetermined height relative to the frame of the machine.

Another further object of my invention is to provide resilient means for counter-balancing the weight of the conveyor to facilitate the raising thereof.

A still further object of my invention is to provide means for adjusting the conveyor relative to the kiln floor, so that the desired depth of bed can be had.

A still further important object of my invention is to provide means for rotating the conveyor at a desired speed independently of the drive and operating mechanism for the malt turning machine.

With these and other objects in view, the invention consists in the novel construction, arrangement and formation of parts, as will be hereinafter more specifically described and claimed and illustrated in the accompanying drawings, in which drawings, Figure 1 is a top plan view of a kiln floor showing the improved motorized malt turning machine mounted for traveling movement back and forth thereover.

Figure 3:
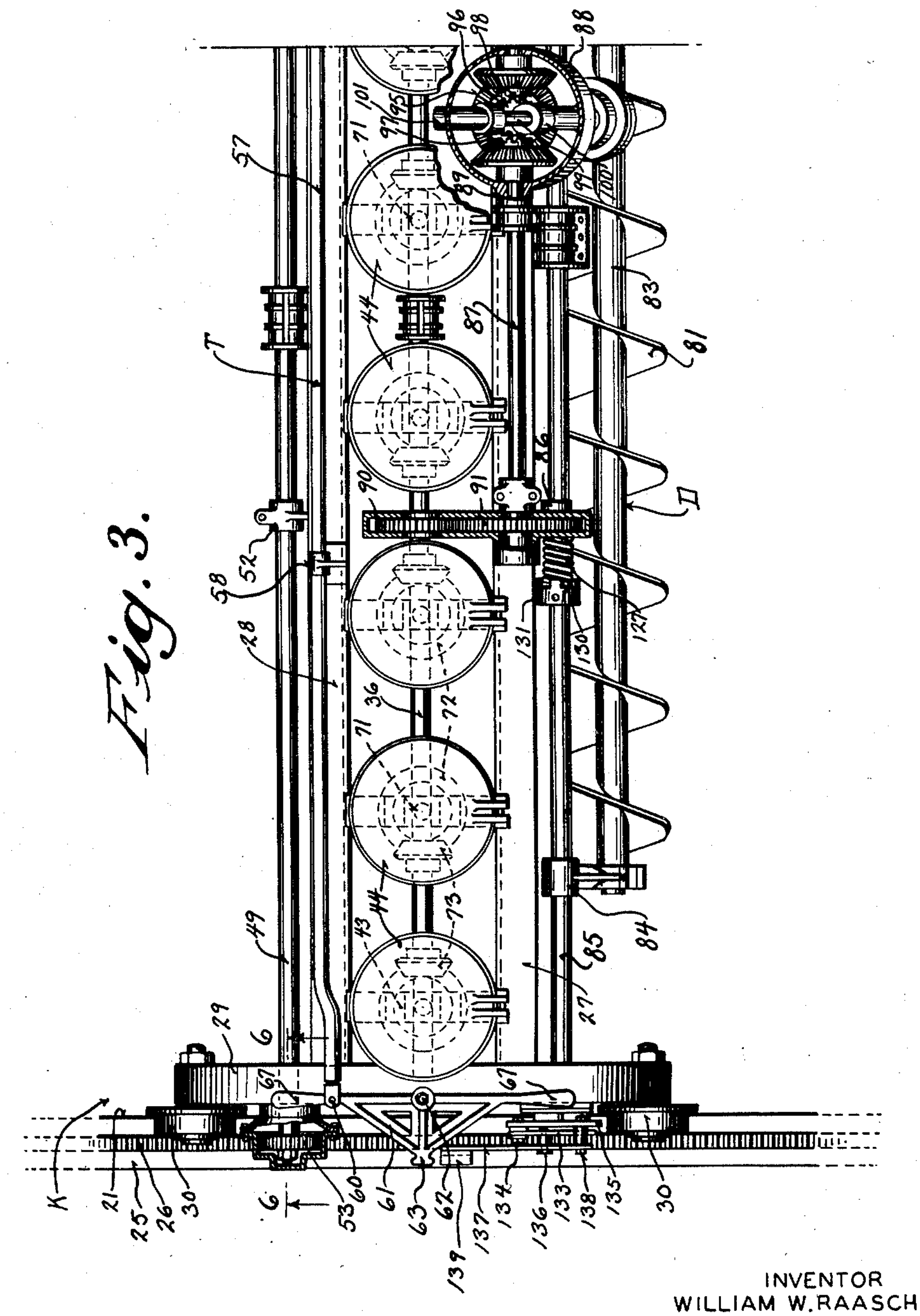
Figure 3 is a top plan view of the left hand side of the improved malt turning machine with parts thereof broken away and in section to illustrate structural detail.

Figure 3ᵃ is a top plan view of the right hand side of the malt turning machine with parts thereof broken away and in section.

Figure 4:
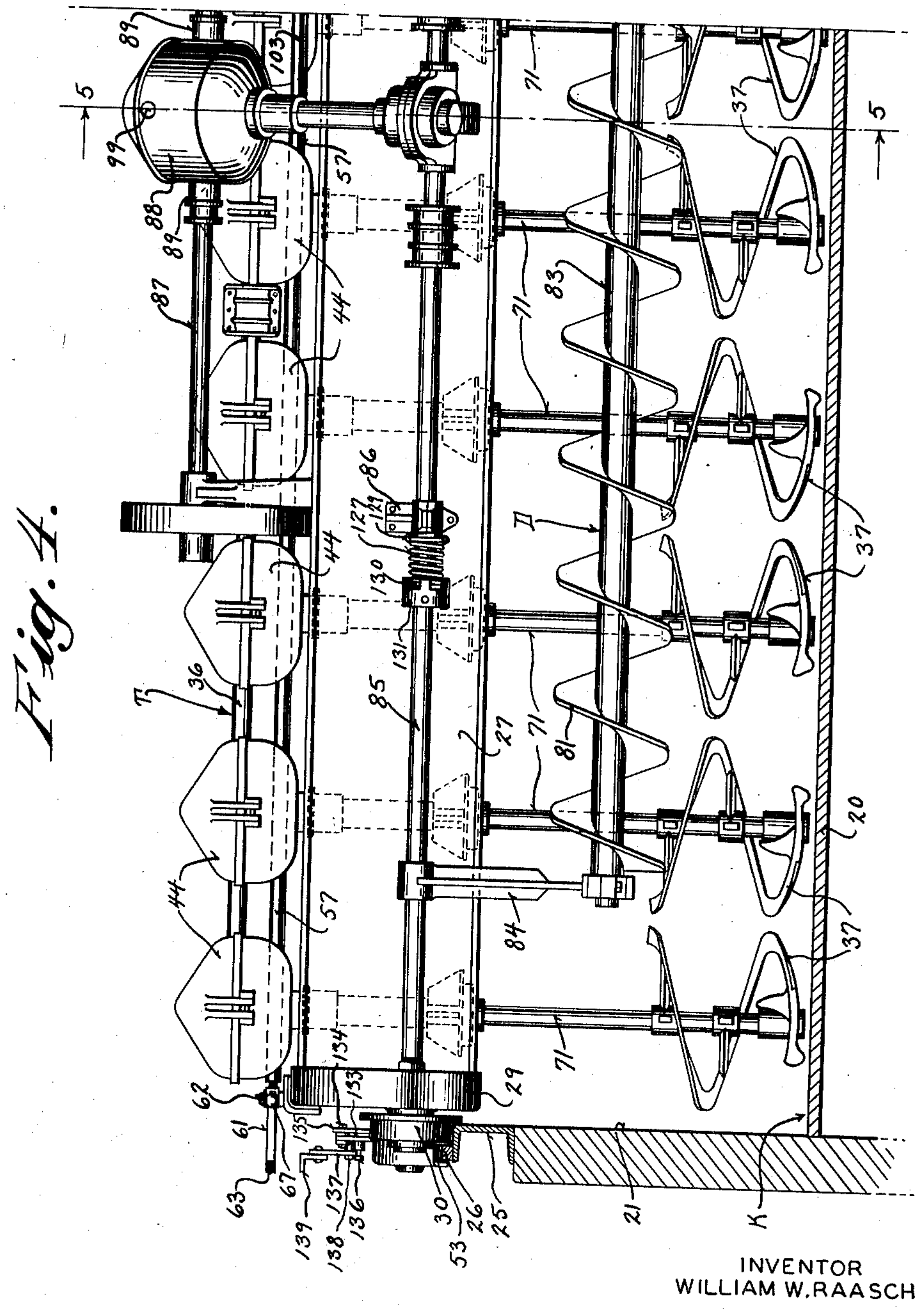
Figure 4A:
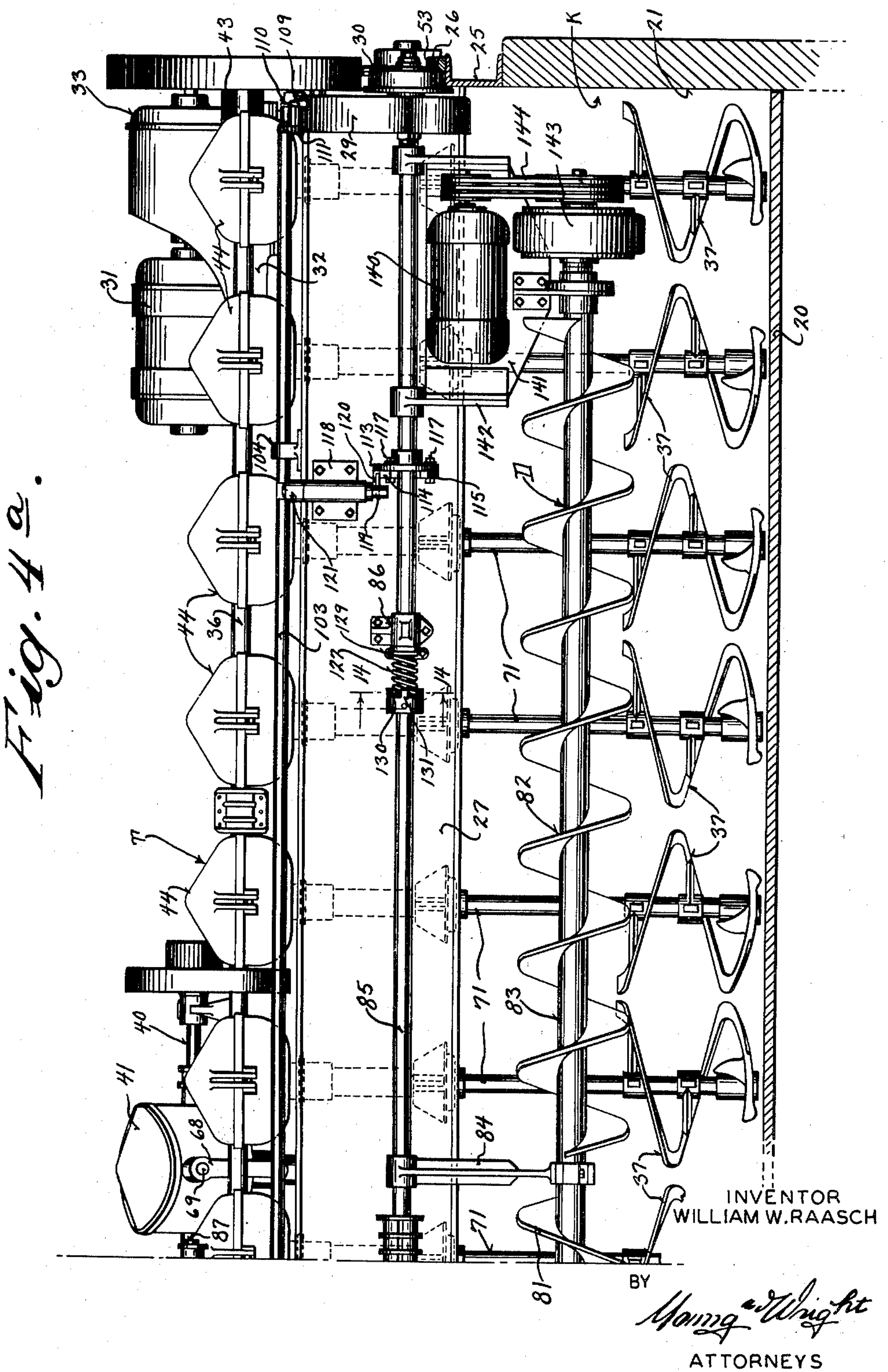

Figure 4 is a front elevational view of the left hand side of the malt turning machine showing the same mounted for traveling movement over the kiln floor, the kiln floor and walls being shown in section.

Figure 4ᵃ is a front elevational view of the right hand side of the malt turning machine, showing the kiln floor and walls in section.

Figure 5:
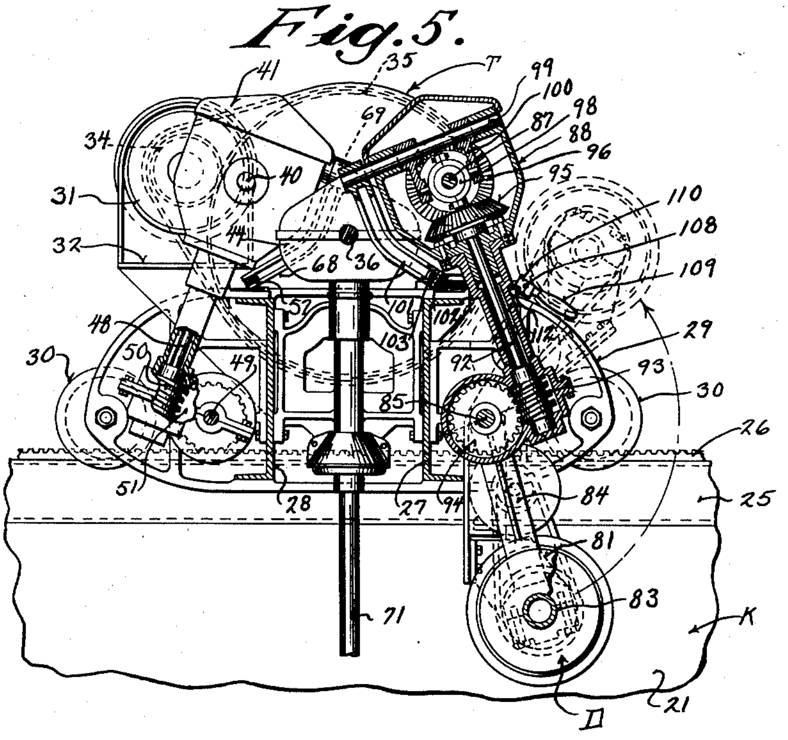

Figure 5 is a fragmentary transverse sectional view through the improved machine taken on the line 5—5 of Figure 4, looking in the direction of the arrows and illustrating more particularly the means employed for raising and lowering the conveyor screw into and out of the malt bed.

Figure 6:
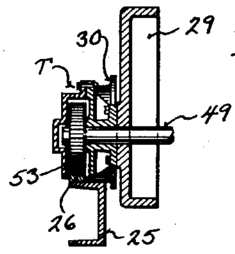

Figure 6 is a detail fragmentary sectional view taken on the line 6—6 of Figure 3 looking in the direction of the arrows, illustrating a portion of the drive for the machine over the kiln floor.

Figure 7:
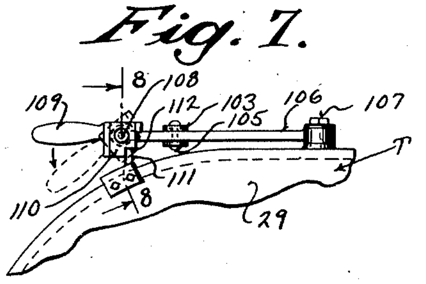

Figure 7 is a fragmentary detail side elevational view illustrating a portion of the shift mechanism for controlling the raising and lowering of the screw conveyor, and more particularly the shift lever with the operating handle in its raised position for permitting manual shifting of the lever to the right or left.

Figure 8:
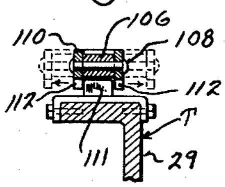

Figure 8 is a detail sectional view taken on the line 8—8 of Figure 7 looking in the direction of the arrows illustrating the lock mechanism for holding the shift lever for the raising and lowering mechanism in a set position, the handle for the shift lever being in its raised unlocked position for permitting manual shifting.

Figure 9:
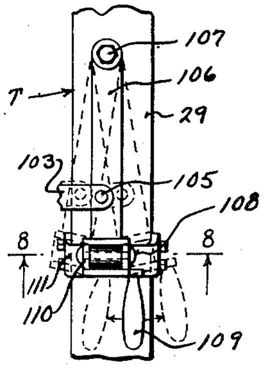

Figure 9 is a fragmentary detail plan view illustrating the shift lever and its operating handle.

Figure 10:
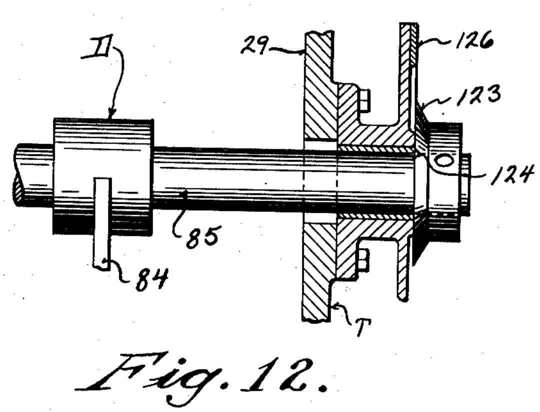

Figure 10 is a fragmentary detail sectional view taken on the line 10—10 of Figure 3ᵃ looking in the direction of the arrows, illustrating a part of the indicating mechanism employed in connection with the hanger and raising and lowering shaft for the conveyor for indicating the position of the screw conveyor relative to the kiln floor.

Figure 11:
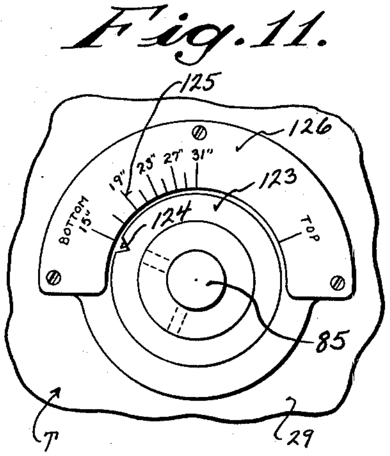

Figure 11 is a detail view illustrating a fragment of one end of the machine and showing the indicating mechanism for the hanger and raising and lowering shaft.

Figures 12, 13, 14, 15:
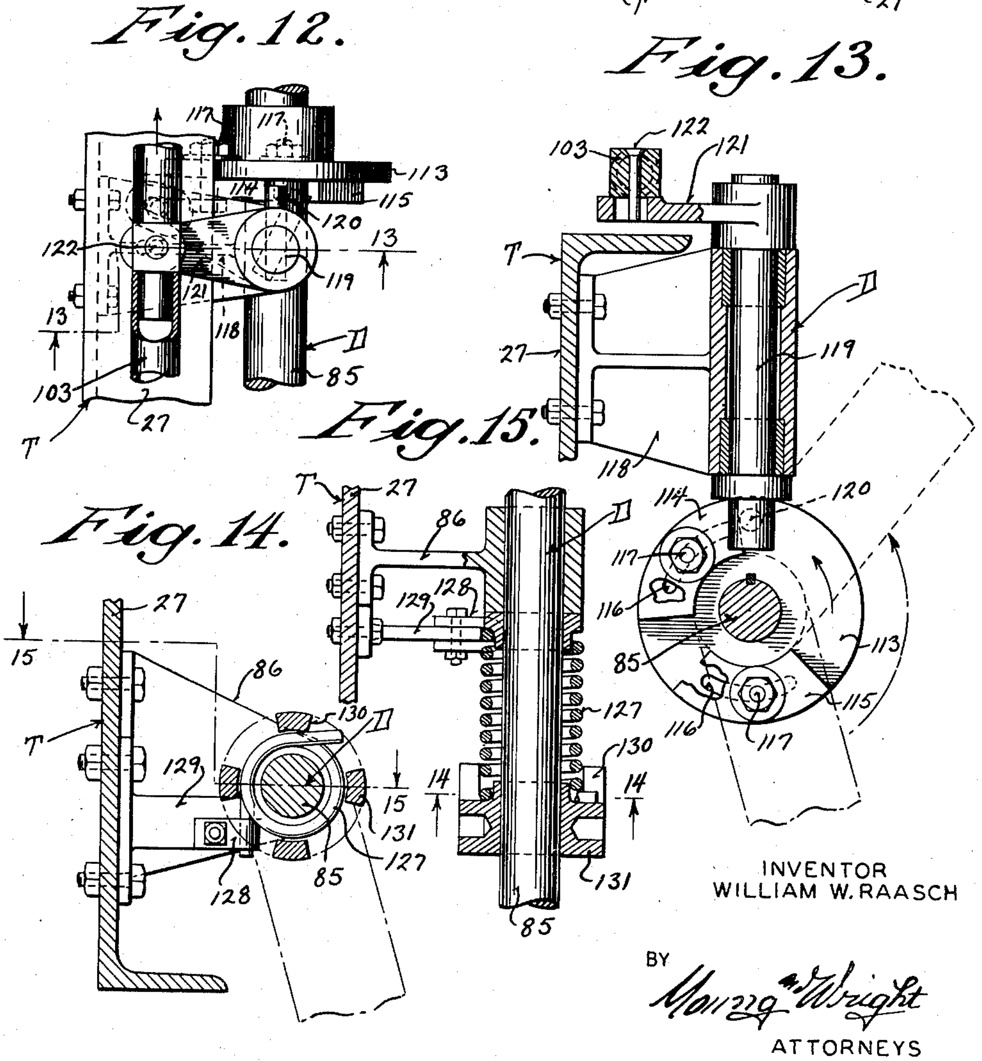

Figure 12 is an enlarged fragmentary top plan view partly in section illustrating the automatic means employed for shifting the raising and lowering mechanism for the conveyor screw when the conveyor screw has been raised a predetermined height or lowered to a predetermined distance relative to the floor of the kiln.

Figure 13 is a detail sectional view taken on the line 13—13 of Figure 12 looking in the direction of the arrows illustrating a part of the automatic shifting mechanism.

Figure 14 is an enlarged detail transverse sectional view taken on the line 14—14 of Figure 4ᵃ, looking in the direction of the arrows illustrating a part of the resilient counter-balancing means connected with the hanger and raising and lowering shaft for the screw conveyor.

Figure 15 is a detail horizontal sectional view taken on the line 15—15 of Figure 14 looking in the direction of the arrows illustrating the resilient counter-balancing means.

Figure 16:
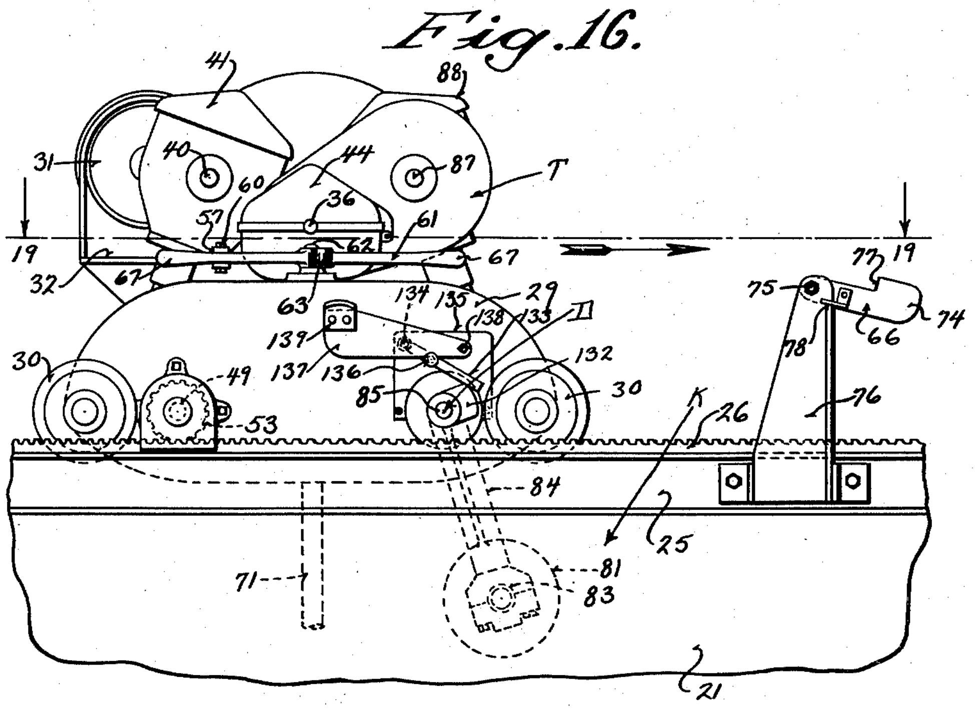

Figure 16 is an end elevational view of the machine mounted on the kiln and showing the machine approaching one end of the kiln.

Figure 17:
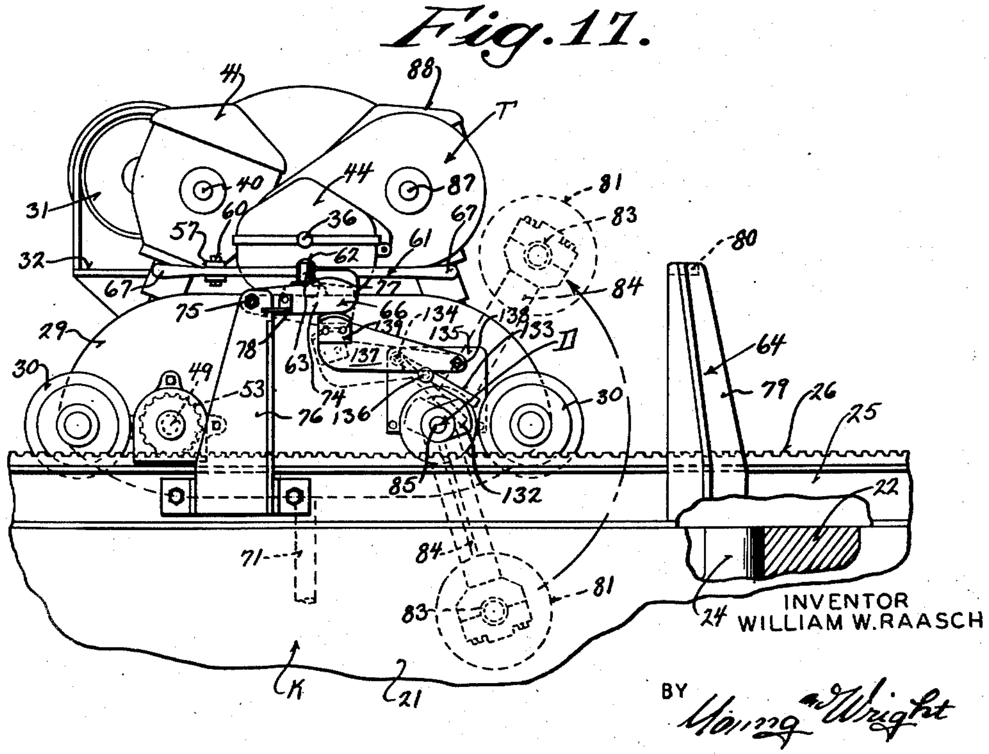

Figure 17 is a view similar to Figure 16, but showing the machine near the end of the kiln with the pivoted shoe on the machine in its raised position and actuating the trip latch for automatically disconnecting the drive of the machine so as to permit the raising of the screw conveyor out of the way.

Figure 18:
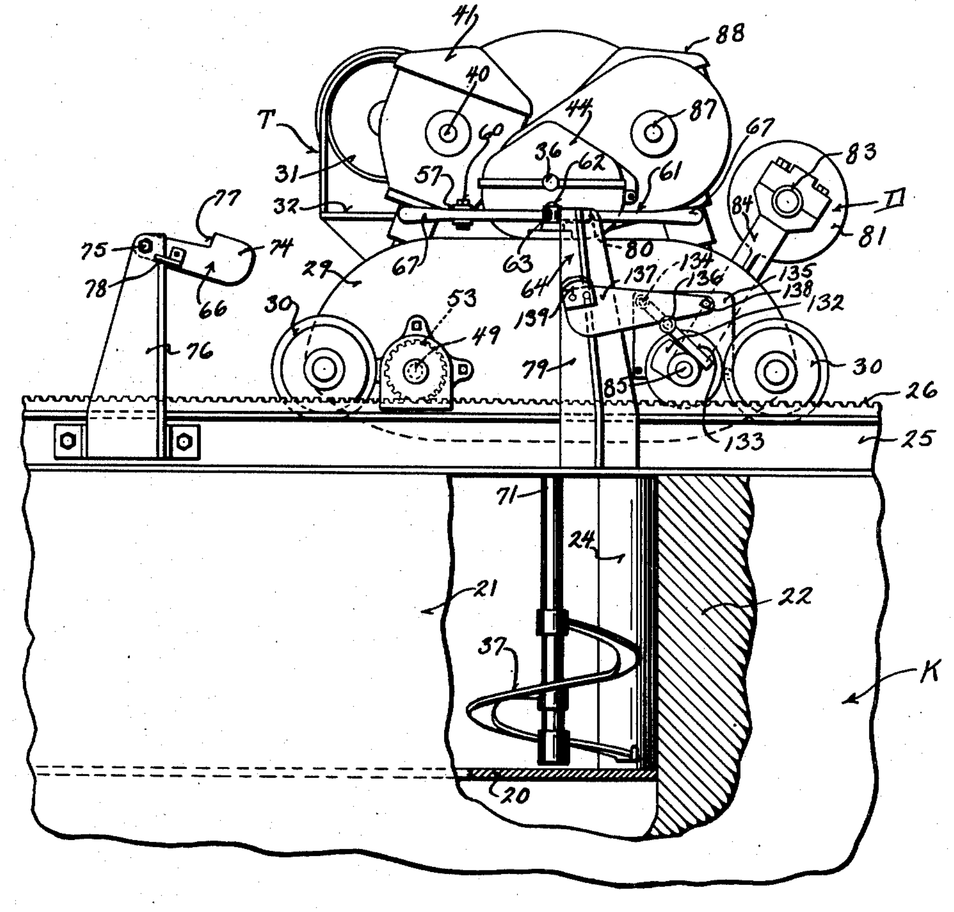

Figure 18 is a view similar to Figures 16 and 17, but showing the machine at the finish of its travel to the end of the kiln with the conveyor in its raised position and the clutch mechanism actuated by the stop on the kiln for disconnecting the drive to the machine.

Figure 19:
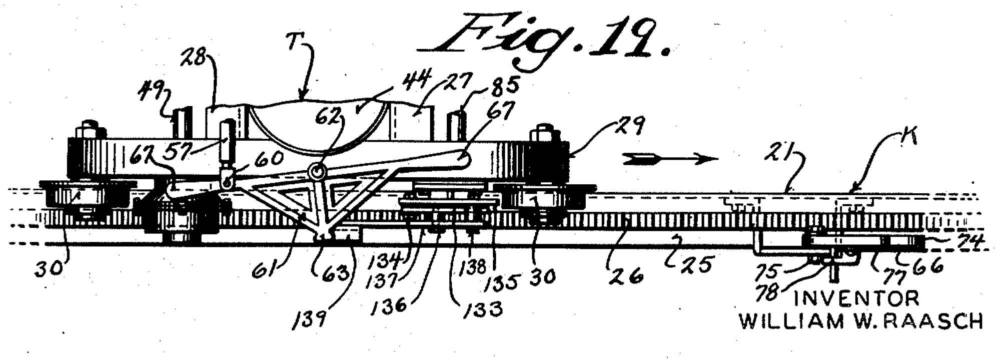

Figure 19 is a fragmentary top plan view of the left hand end of the machine mounted on the kiln with the parts in their position shown in Figure 16.

Referring to the drawings in detail, wherein similar reference characters designate corresponding parts throughout the several views, the letter T generally indicates the malt turning machine mounted for traveling movement back and forth over the kiln K.

Figure 1:
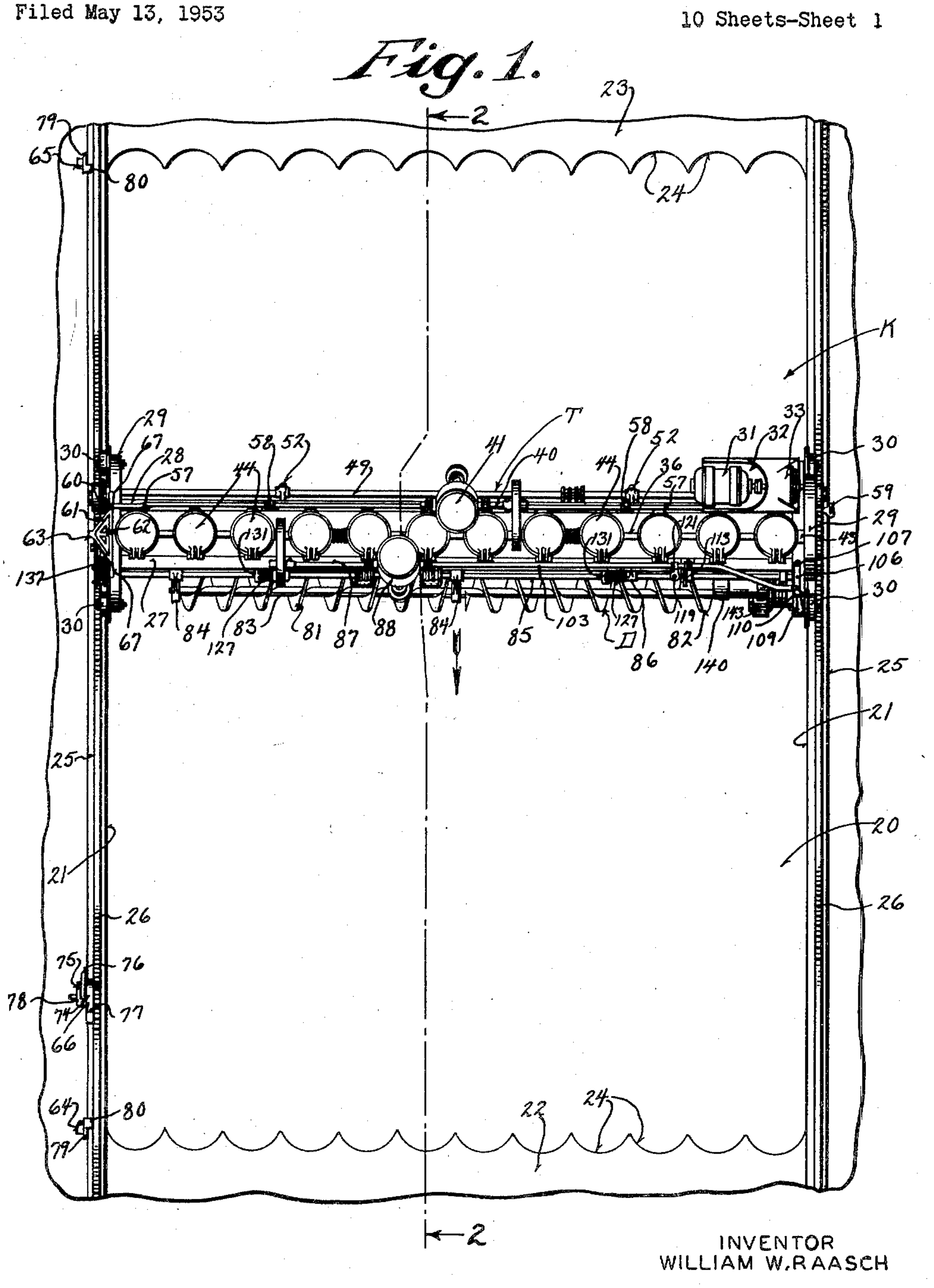
Figure 2:
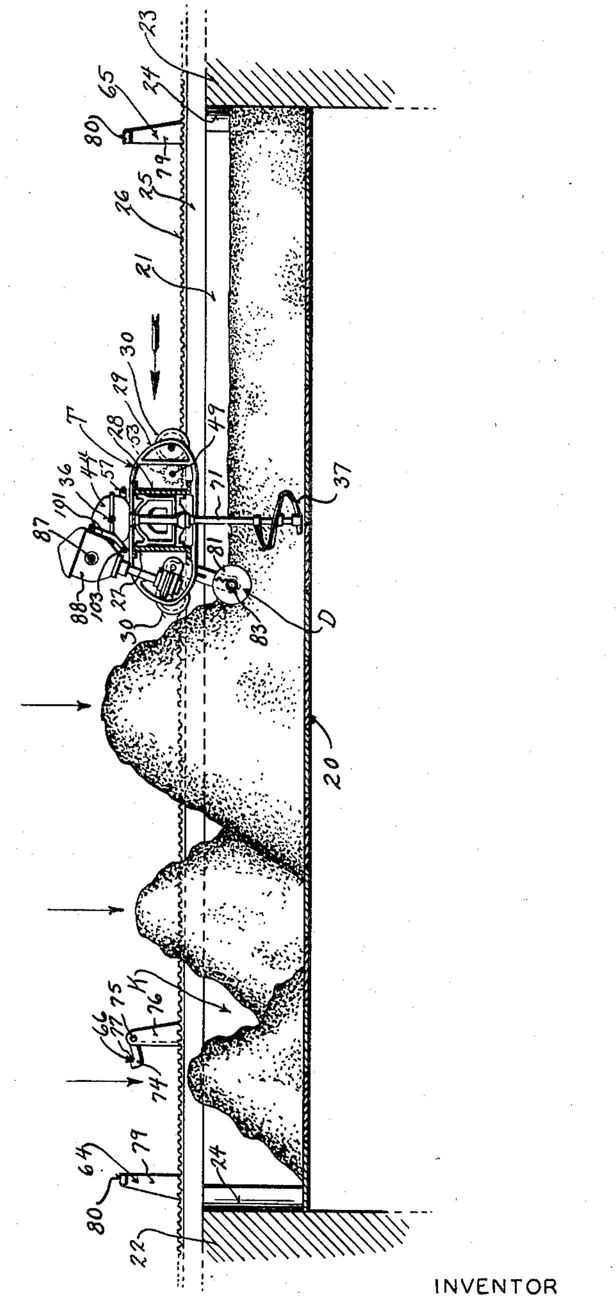
Figure 2 is a longitudinal sectional view taken on the line 2—2 of Figure 1, looking in the direction of the arrows, and illustrating the conveyor screw engaging the mounds or piles of malt for evenly distributing the malt over the kiln floor to a desired depth.

The kiln K forms a part of a building and can be considered as the upper floor of the building. The kiln itself forms no part of the present invention, but as shown in Figures 1 and 2, the same includes a floor 20 embodying a plurality of foraminous plates which can be turned to dump the malt after the initial drying period on the floor below. The kiln also includes longitudinally extending side walls 21 and end walls 22 and 23. The end walls are provided with niches 24, the purpose of which will later appear. In accordance with the usual practice, the side walls 21 have secured to their upper faces longitudinally extending rails 25 and forming a part of the rails are longitudinally extending rack bars 26, the purpose of which will also later appear.

The malt turning machine T, as heretofore intimated, travels from one end of the kiln floor to the other on the tracks 25, and the machine is supported on the tracks and extends transversely of the kiln. The machine T includes the novel malt distributor D, which forms the essential feature of this invention, and in order to fully comprehend the invention, the malt turning machine will now be described in some detail.

The malt turning machine T includes a pair of spaced channel beams 27 and 28 which extend longitudinally of the machine and the ends of the beams have rigidly secured thereto end castings 29, which constitute the carriage for the machine. The end castings or carriages 29 adjacent to their forward and rear ends carry rollers 30 engaging the tracks 25, and these rollers support the machine for the traveling movement over the track.

Figure 3A:
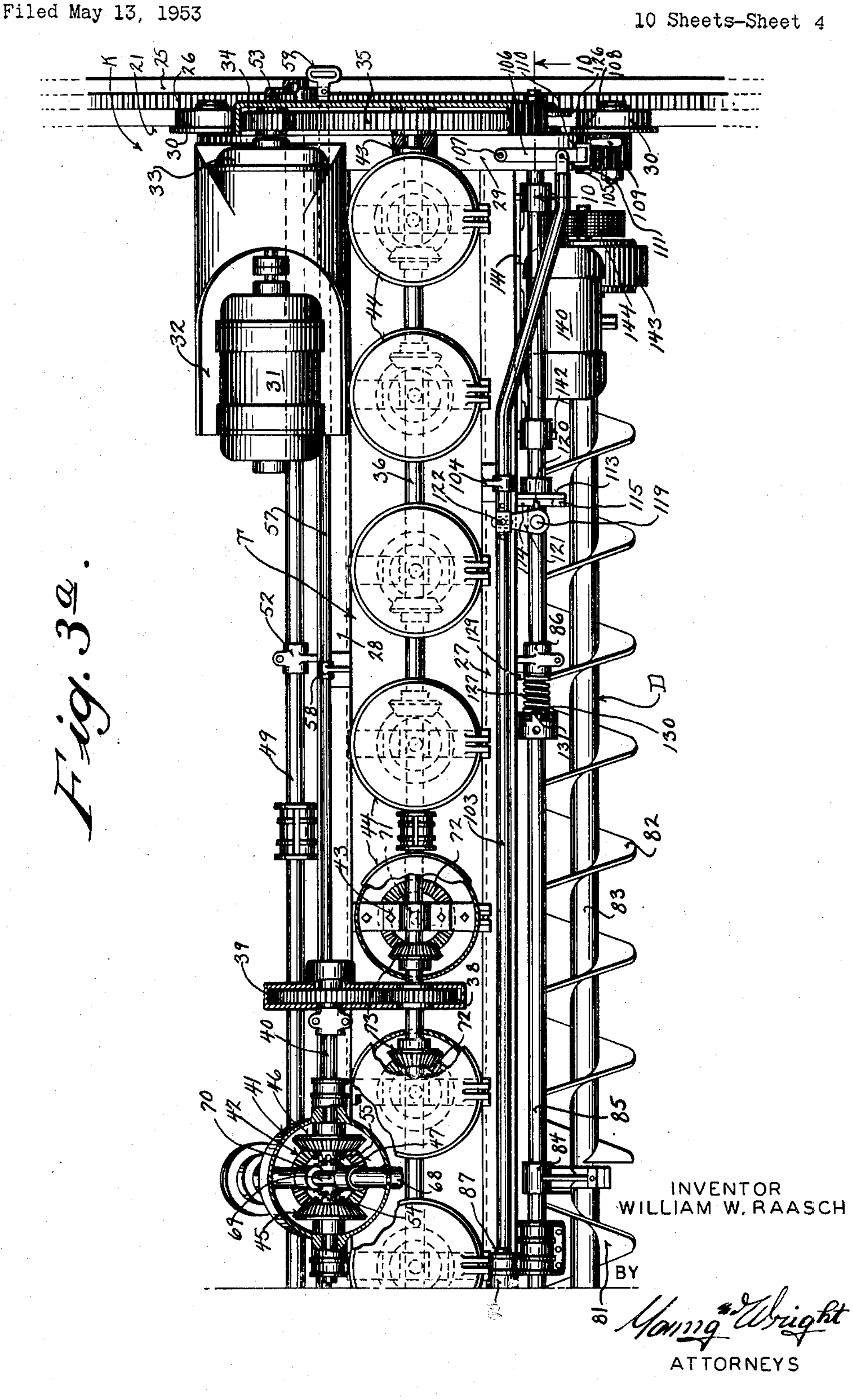

In order to propel the machine back and forth, I provide an electric motor 31, mounted on a suitable platform 32 carried by the frame of the machine. Also carried by the platform 32 is a gear reducing mechanism 33 operatively connected to the electric motor and the output of the gear reducer 33 carries a pinion 34 meshing with the main drive gear 35. The gear 35 is keyed, or otherwise secured, to a main drive shaft 36 which extends longitudinally of the machine and this main drive shaft is employed for rotating the helical malt turning blades 37, as will be more clearly set forth. At this time, and by referring to Figure 3a, it can be seen that the main drive shaft has keyed, or otherwise secured thereto, a drive pinion 38, which meshes with a gear 39 keyed, or otherwise secured, to a counter-shaft 40, which is rotatably mounted in suitable bearings carried by the gear housing 41 for the reverse gear mechanism 42. The main drive shaft 36 is rotatably supported in suitable bearings 43 preferably carried by the equidistantly spaced gear casings or pots 44 forming a part of the drive and support for the helical malt turning blades 37, and it can be seen that the main drive shaft 36 extends through all of said gear casing or pots 44. Now referring back to the drive for the machine, it will be noticed that the counter-shaft 40 extends through the gear casing 41 and rotatably mounted on the shaft 40 within the gear casing are oppositely directed bevel pinions 45 and 46 constantly meshing with a bevel gear 47. The gear 47 is keyed, or otherwise secured, to a depending drive shaft 48 mounted in bearings carried by the casing 41 and the lower end of this shaft is operatively connected to a main propelling shaft 49 which extends longitudinally of the machine by means of a worm 50 on the shaft 48, and a worm wheel 51 on the propelling shaft 49. The propelling shaft 49 is carried by hanger brackets 52 rigidly secured to the machine frame, and the ends of this propelling shaft have keyed or otherwise secured thereto, spur rack pinions 53, which mesh with the rack bars 26 on the tracks so that upon operation of the motor 31, the machine will be propelled. Now referring to the reverse gear mechanism 42 and Figure 3a, it can be seen that the facing bevel gears 45 and 46 are provided with clutch faces 54 and splined or feathered on the counter-shaft 40 for rotation therewith, is a shiftable clutch section 55. By moving the clutch section 55 into engagement with either the clutch face carried by the pinion 45 or the clutch face carried by the pinion 46, the propelling shaft 49 can be driven in the desired direction for propelling the machine forward or backward over the kiln floor. Mechanism is provided for automatically operating the clutch section 55 in certain instances and for operating this clutch section by hand. It is to be also understood that when the clutch section 55 is in its neutral position, i. e., out of clutching engagement with the bevel gear 45 or bevel gear 46, the machine will be motionless.

The means for shifting the clutch section includes a shift bar 57 and this shift bar extends longitudinally of the machine and is slidably mounted in supporting brackets 58 mounted on the frame of the machine. One end of the shift bar terminates adjacent to the right hand side of the machine (Figure 3a), and is provided with a manipulating handle 59 which can be conveniently grasped by an operator to move the shift bar back and forth. The opposite end of the shift bar terminates adjacent to the left hand side of the machine and is hingedly connected, as at 60, to a triangularly shaped shifter lever 61. This shifter lever is rockably mounted equidistant its ends on a vertically disposed pivot stud 62 carried by the left hand end carriage 29. This shifter lever 61 projects over the track at one side of the kiln, for a purpose which will also later appear, and this portion of the lever has formed thereon a shifter knob 63 which is actuated by end stop members 64 and 65 located at the opposite ends of the kiln and a trip lever 66 located adjacent to the stop 64. The ends of the shifter lever 61 can also be provided with hand grips 67, whereby the shifter lever can be manually actuated. The automatic means for shifting the bar 57 of which the shifter lever 61, the stops 64 and 65 and the trip 66 form a part, will be hereinafter more specifically described. The shift bar 57 has pivotally connected thereto a shift crank 68, keyed or otherwise secured to a rock shaft 69 carried by the gear casing 41 and this rock shaft has secured thereto the shifter yoke 70 operatively connected to the clutch section 55 so that upon movement of the shift bar the clutch section 55 can be actuated so that either the bevel gear 45 or the bevel gear 46 will be driven or the clutch section maintained in a neutral position.

The turning mechanism for the malt includes a plurality of helix blades 37 heretofore mentioned, and it is to be noted that these blades are arranged in pairs with the helixes running in opposite directions and these blades are carried by substantially vertically extending shafts 71 rotatably mounted on the frame of the machine and the upper ends of these shafts extend into the gear casings or pots 44 and each has keyed or otherwise secured thereto bevel drive gear, 72. The main drive shaft has keyed thereto drive pinions 73 which mesh with the drive gears 72 and by referring to Figures 3 and 3a, it can be seen that the pinions 73 engage the opposite sides of the respective gears 72 for the pairs of turning blades. The shafts 71 terminate adjacent to the kiln floor and it can be seen that as the machine is propelled back and forth, the turning blades are rotated.

The parts of the machine above described are common in a machine now in use, but the shifter lever 61 cooperates with the trip 66 for permitting the convenient use of the distributor D which forms the essential part of this invention.

The trip 66 includes a trip lever or arm 74 pivoted at its inner end, as at 75, to a standard 76 bolted or otherwise fastened to the adjacent rail 25. The forward end of the lever has formed on its upper edge a trip shoulder 77. Normally, the trip lever 74 is held by gravity down and out of the path of the shifter knob 63 during the forward travel of the machine, and this trip lever is automatically raised to its tripping position and in the path of the shifter knob 63 by a part of the distributor mechanism D. A stop bracket 78 limits the downward swinging movement of the trip lever. The trip lever 74 is located an exact distance from the stop 64 so that when the clutch section 55 is moved to its neutral position by the trip lever, the machine will be stopped the required distance from the end wall 22.

The stops 64 and 65 are of identical construction and each includes an upright standard 79 bolted or otherwise fastened to the adjacent rail 25 at the extreme ends of the kiln and the upper end of each standard has formed thereon an inturned lug 80 which is at all times in the path of the travel of the shifter knob 63, so that as the machine reaches the end of the kiln the clutch section 55 will be automatically moved to its neutral position and the machine brought to a stop.

Now referring specifically to the distributor D, the same includes a screw conveyor disposed in front of the machine and this conveyor includes left and right hand screw conveyor sections 81 and 82 (see Figure 1), and these sections extend laterally from the transverse center of the machine toward the opposite ends thereof, and these sections are mounted upon or form a part of a longitudinally extending shaft 83, which is rotatably carried by spaced hanger brackets 84, keyed or otherwise fastened to a rock hanger shaft 85. This rock hanger shaft 85 is mounted in front of the frame beam 27 and is rotatably mounted in suitable bearing brackets 86 carried by the beam and the end castings or carriages 29. By turning the rock shaft 85 the conveyor can be raised or lowered into and out of operating position according to the direction of the rotation of the shaft 85. This shaft is power operated from the main drive shaft 36, as will now be described. Disposed above the main drive shaft and the rock hanger shaft 85 is a counter-shaft 87 which extends through a gear casing or pot 88. The gear casing 88 is rigidly secured to the frame of the machine and the gear casing carries bearings 89 for supporting the counter-shaft and the frame, of course, can carry other bearings for this shaft. Keyed or otherwise fastened to the main drive shaft is a pinion 90 meshing with a gear 91, keyed or otherwise secured, to the counter-shaft 87 and consequently the counter-shaft 87 is driven constantly from the main drive shaft 36 as long as this shaft is in operation. Depending from the gear casing 88, and rotatably carried thereby is a drive shaft 92 and this shaft has formed thereon, or secured thereto, a worm 93 which meshes with a worm wheel 94 secured to the rock hanger shaft 85. The counter-shaft 87 has rotatably mounted thereon facing bevel gear pinions 95 and 96 mounted in the gear casing 88, and these bevel pinions 95 and 96 constantly mesh with the opposite sides of a bevel gear 97 fastened to the drive shaft 92. The hubs of these pinions are provided with clutch faces 97 and a sliding clutch section 98 is keyed to the counter-shaft and is movable into driving engagement with the clutch face of either the pinion 95 or 96 or to a neutral position between the clutch faces of the gears or pinions 95 and 96. Hence, depending on the position of the clutch section 98, the rock shaft can be turned to raise the screw conveyor or to lower the screw conveyor, and when the clutch section 98 is in its neutral position, drive to the rock shaft is interrupted. Rockably mounted in the gear casing 88 is a clutch shifter shaft 99 carrying a yoke 100 operatively connected to the clutch section 98. One end of the shifter shaft 99 has secured thereto a depending crank 101 which is pivotally connected, as at 102, to a shifter bar 103. From the description so far, it can be seen that the power drive for turning the hanger shaft 94 is of the same construction as the mechanism for rotating the machine propeller shaft 49 in opposite directions.

The shifter bar 103 extends longitudinally of the machine and is slidably mounted in suitable supporting brackets 104 carried by the frame of the machine, and the right hand end of the shift bar (see Figure 3a), is pivoted as at 105 to a shift lever 106. The inner end of this lever is rockably mounted on a stud 107, carried by the adjacent casting or carriage 29 (also see Figures 7, 8 and 9). The forward end of the shift lever 106 has pivotally connected thereto by a transverse pivot bolt 108, an operating handle 109. The handle below the pivot bolt is provided with a pair of rigid latch lugs 110 which are adapted to straddle and engage the opposite sides of a keeper plate 111 bolted or otherwise fastened to the adjacent casting or carriage 29 when the handle is in its lowered position. The handle 109 is normally held in a lowered position by gravity with the latch lugs engaging the opposite sides of the keeper plate 111 to hold the shift lever 106 against accidental movement and in a neutral position. The inner corners of the latch lugs 110 are notched as at 112, so that when the handle is raised, the lever can be shifted to the right or left to actuate the clutch section 98 for bringing about the turning of the hanger rock shaft 85 in the desired direction. By referring to Figures 8 and 9, it can be seen that when the lever 106 is shifted to the right or left to engage the clutch section, that one of the latch lugs rests on top of the keeper plate 111 so that the lever can be moved back to a neutral position by certain means, which will now be described without being actuated by hand.

Now considering that the lever has been shifted to engage the clutch section 98 with the desired pinion 95 or 96 for raising, or lowering the conveyor and distributing screw, as the case may be, the shaft 85 will turn a certain distance and at the limit of this distance the clutch is automatically returned to a neutral position. This is brought about by a throw-out plate 113 fastened to the hanger rock shaft 85 and adjustably mounted on one face of the throw-out plate are throw-out blocks 114 and 115. As illustrated in Figure 13, the plate is provided with arcuate slots 116 through which extend bolts 117 carried by the blocks 114 and 115 and by loosening and tightening the bolts, the blocks can be adjusted circumferentially around the plate to a desired set position to limit the upward and downward swinging movement of the conveyor distributing screw. Mounted on a bracket 118 above the shaft 85 and throw-out plate 113, is a vertically extending crank shaft 119. The lower end of the shaft is provided with a crank pin 120 which projects toward the plate 113, in such a manner that upon turning of the plate a certain distance either the block 114 or the block 115 (depending upon direction of turning of the shaft 85), will engage the pin and turn the shaft 119. The upper end of the shaft has fastened thereto a crank arm 121 and this arm is in turn operatively connected, by means of a pivot pin 122 with the clutch shifter bar 103. Upon turning of the crank shaft 119 in one direction or the other, the clutch section 98 will be automatically moved to its neutral position.

To indicate the position of the conveyor distributor screw, relative to the kiln floor 20 one end of the shaft carries an indicator disc 123 having an indicator marker 124. This indicator marker cooperates with indicia 125 on a dial plate 126 fastened to a carriage 29 (see Figures 10 and 11).

In order to counterbalance, within certain limits, the weight of the conveyor and distributing screw during the raising and lowering thereof, the rock hanger shaft 85 has mounted thereon, at spaced points, coil springs 127. One end of each spring (see Figures 14 and 15), is secured by means of a clamp 128, to a bracket plate 129 bolted, or otherwise secured to the frame beam 27. The opposite end of each spring 127 is fitted within a selected notch 130 of a notched plate 131, keyed or otherwise fastened to the rock shaft 85. The tension of the springs can be increased or decreased by anchoring the spring in the desired notch or by turning the notched hub plate on the shaft and then fastening the hub plate to the shaft.

As heretofore intimated, means cooperating with the distributor D operates to raise and lower the trip lever 66 into and out of the path of the shifter knob 63 of the shifter lever 61 for the clutch segment 55 which controls the propelling of the machine in the desired direction. This means includes a cam 132 secured to the opposite end of the hanger rock shaft 85 from the dial member 123 and normally resting on the cam is a lift finger 133. The lift finger at its extreme upper end is pivoted, as at 134 to a bracket plate 135 carried by the adjacent casting or carriage 29. The lifter finger 133 intermediate its ends is provided with a lift roller 136 which supports a lift shoe 137 for the trip lever 66. The lift shoe 137 is pivotally mounted as at 138 to the bracket plate 125 and the end of the shoe remote from the pivot is provided with a lift shoe plate 139.

In operation of the machine, and considering that the machine is traveling in the direction of the arrows (see Figures 1 and 2), toward the end wall 22 and the trip lever 66 with the conveyor distributing screw in its lowered position, then the screw will engage the piles or mounds of the malt and the right and left hand helical sections 81 and 82 thereof will effectively engage the malt and move the same laterally of the kiln and evenly over the floor in opposite directions. At this time, the throw portion of the cam 132 (see Figures 16 and 17), holds the lift finger 133 in a raised position and the shoe 137 in such a position that the lift portion 139 thereof will engage the trip arm 74 of the trip lever 66 with the shoulder 77 in position to engage the shifter knob 63. Upon engagement of the shifter knob with the shoulder 77, the shifter lever 61 will be actuated and the clutch section 55 will be moved to a neutral position and the propelling mechanism for the machine will be stopped, just short of the end wall 22, so that the conveyor distributor screw will not engage the wall 22 of the kiln. The operator now operates manually the handle 109 and the lever 106 of the raising mechanism for the conveyor in such a manner that the clutch section 98 will engage the correct gear 95 or 96 to turn the hanger rock shaft 85 and raise the conveyor distributor screw. As the conveyor distributor screw reaches the desired height the throw-out block 115 will operate the crank pin 120 to move the shifter bar 103 so as to disconnect the clutch section 98 from the drive pinion. After the conveyor screw has been raised the desired distance the lift finger 133 will fall against the flat side of the cam 132 (see Figure 18) and the operator of the machine then operates manually the clutch section 55 by moving either the shifter lever 61 or the shifter handle 59 to engage this clutch section with the desired pinion and the machine will continue its movement toward the wall 22 and the helix blades 37 can ride into the niches 24 to completely agitate the malt at this end of the kiln. At this exact time, the shifter knob 63 will engage the stop 64 to again move the clutch section 55 to its neutral position and stop the propelling of the machine.

The machine can now be reversed by the operator by manually actuating the shifter bar 57 to connect the clutch section 55 with the correct pinion.

Great stress is laid on the position of the conveyor screw relative to the helix blades 37, and as heretofore brought out, the conveyor distributor screw will effectively level the malt in front of the helix blades. Great stress is also laid on the raising and lowering mechanism for the screw and the automatic disconnection of the drive for propelling the machine according to the position of the screw, and as the machine reaches one end wall of the kiln.

The conveyor distributor screw is driven independently from the propelling mechanism and operating means for the turning blades 37, in order to relieve undue load on the prime mover for these parts. To bring about the rotation of the conveyor and levelling screw, I employ an electric motor 140. This motor 140 is secured to a platform plate 141 rigidly carried by arms 142 firmly secured to the hanger rock shaft 85. The armature shaft of the motor is operatively connected to one end of the shaft 83 of the conveyor and levelling screw. I preferably interpose a speed reducing mechanism 143 between the shaft 83 and the motor, and the input of the speed reducing mechanism 143 can be operatively connected to the armature shaft by V-pulley belts 144 and pulley wheels. The output of the speed reducing mechanism is connected directly to the shaft 83. Attention is called to the fact that the motor 140 swings with the rock shaft 85 and the feed and conveyor screw, so that the conveyor and levelling screw will be properly actuated irrespective of the raising and lowering of this screw.

Changes in details may be made without departing from the spirit or the scope of this invention, but what I claim as new is:

1. In a malt turning machine of the type embodying a plurality of equidistantly spaced, vertically disposed turning blades and means for propelling the machine back and forth over a kiln floor; of a horizontally disposed rotary levelling and conveyor screw rotatably mounted on the machine in front of said blades for engaging the malt prior to the turning blades and for carrying the malt to the outermost turning blades.

2. In a malt turning machine as defined in claim 1, and means for raising the screw above the blades to an inoperative position and for lowering the screw to an operative position from a part of the propelling mechanism of the machine.

3. In a malt turning machine as defined in claim 1, and means for rotating the screw.

4. In a malt turning machine as defined in claim 2, and means for driving the screw.

5. In a malt turning machine of the type adapted to be propelled back and forth over a kiln floor and including a plurality of vertically disposed rotatable malt turning blades spaced equidistantly throughout the length of the machine; a horizontally disposed levelling and distributing screw mounted on the machine in front of the malt turning blades including right and left hand sections meeting at the transverse center of the machine and extending toward the opposite ends of the machine for carrying the malt to the outermost malt turning blades prior to the engagement of the blades with the malt.

6. In a malt turning machine as defined in claim 5, and means for continuously rotating said distributing and levelling screw.

7. In a malt turning machine as defined in claim 5, and means for raising the lowering, the distributing and levelling screw into and out of operative position relative to the kiln floor.

8. In a malt turning machine of the type adapted to be propelled back and forth over the kiln, the kiln including a floor, side and end walls and the machine also including a plurality of vertically disposed rotatable malt turning blades spaced equidistantly along the length of the machine; and a horizontally disposed distributing and levelling conveyor carried by the machine in front of the malt turning blades, means for rotating the conveyor, and means for lowering the conveyor into operative position relative to the kiln floor and for raising the conveyor above the kiln floor and blades and one end wall of the kiln.

9. In a malt turning machine as defined in claim 8, and said conveyor including right and left hand conveyor screws extending in opposite directions from the transverse center of the machine toward its ends to distribute the malt to the outermost malt turning blades.

10. In a machine for turning malt as defined in claim 8, and means for automatically disconnecting the propelling mechanism for the machine as the machine approaches an end wall with the conveyor in a lowered operative position.

11. In a malt turning machine of the type embodying a frame adapted to extend transversely across a kiln, a plurality of rotatable malt turning blades on the frame, and means for propelling the machine back and forth over a kiln floor; of a levelling and distributing conveyor disposed in front of the malt turning blades, means for mounting the conveyor on the frame including a hanger rock shaft, bracket arms secured to the rock shaft for movement therewith, means rotatably supporting the conveyor on the bracket arms, means for rotating the conveyor, and means for turning the rock shaft in opposite directions for swinging the conveyor to a lowered operative position relative to the kiln floor and to a raised inoperative position above the kiln floor, and said means for turning the rock shaft in opposite directions including a drive shaft for the rock shaft, means operatively connecting the drive shaft to the rock shaft, a pair of facing pinions rotatable on the drive shaft, a clutch section feathered on the drive shaft for rotation therewith and movable into operative driving connection with either one of the pinions and to a neutral position between the pinions, manual means for actuating the clutch section and automatic means for actuating the clutch section.

12. In a malt turning machine as defined in claim 11, and said automatic means including a shift bar operatively connected to the clutch section, a throw-out plate secured to the rock shaft for movement therewith, throw-out blocks on one face of the plate, a crank shaft rotatably carried by the frame disposed at right angles to the rock shaft and shift bar, a crank pin on the crank shaft disposed in the path of rotation of the blocks and adapted to be actuated thereby upon turning movement of the rock shaft, and a crank arm on said crank shaft operatively connected to the shift bar.

13. In a malt turning machine as defined in claim 12, and said blocks being adjustable circumferentially around the plate.

14. In a malt turning machine of the type adapted to be propelled back and forth over a kiln, the kiln being of the type including a floor, side and end walls and the machine including a frame extending transversely across the kiln, a plurality of rotatable malt turning blades spaced equidistantly along the length of the machine, means for propelling the machine back and forth over the kiln including a throw-out clutch for disconnecting the propelling mechanism; of a horizontally disposed distributing and levelling conveyor carried by the frame in front of the malt turning blades, means for rotating the conveyor, and means for raising and lowering the conveyor into operative position relative to the kiln floor and for raising the conveyor above the kiln floor and one end wall of the kiln, a trip lever on said kiln adjacent to said end wall of the kiln and spaced a predetermined distance therefrom, and a shifter lever for said clutch rockably carried by the frame and actuated by said shift lever as the machine approaches said end wall.

15. In a malt turning machine as defined in claim 14 and said trip lever including a pivoted arm normally disposed out of the path of the shifter lever and means for raising said arm into the path of the shifter lever when said conveyor is in its lowered operative position relative to the kiln floor.

16. In a malt turning machine of the type adapted to be propelled back and forth over a kiln, the kiln being of the type including a floor, side and end walls and the machine including a frame extending transversely across the kiln, a plurality of rotatable malt turning blades spaced equidistantly along the length of the frame, means for propelling the machine back and forth along the kiln and over the floor including a throw-out clutch, a shifter lever for said clutch projecting over one side wall of the kiln, and means for rotating the malt turning blades, of a horizontally disposed malt distributing and levelling conveyor disposed in front of the malt turning blades, a hanger rock shaft mounted upon the frame, bracket arms secured to the rock shaft for movement therewith rotatably supporting the conveyor, means for rotating the conveyor, means for turning the rock shaft in opposite directions for moving the conveyor to a lowered operative position relative to the kiln floor and to a raised inoperative position above the kiln floor and one end wall of the kiln, a trip lever on one side wall of the kiln located a predetermined distance from said end wall including a pivoted arm for actuating the shifter lever and normally disposed below the path of travel of the shifter lever, and means for raising the arm into the path of the shifter lever for actuating said shifter lever to throw out the clutch including a cam on said rock shaft movable therewith and for holding the arm in its operative raised position when the conveyor is in its lowered operative position, whereby the drive of the machine will be disconnected automatically when the machine reaches a predetermined distance relative to said end wall.

17. In a malt turning machine as defined in claim 16 and automatic means for disconnecting the lowering and raising means for the conveyor as the conveyor reaches a predetermined lowered position and a predetermined raised position.

References Cited in the file of this patent

UNITED STATES PATENTS

| | | |
|---|---|---|
| 532,543 | Dornfeld | Jan. 15, 1895 |
| 636,959 | Dornfeld | Nov. 14, 1899 |
| 1,677,619 | Cleminshaw | July 17, 1928 |
| 1,737,144 | Camerota | Nov. 26, 1929 |

FOREIGN PATENTS

| | | |
|---|---|---|
| 557,964 | Germany | Aug. 30, 1932 |
| 10,715 | Great Britain | May 11, 1903 |